W. DALTON.
ELECTRIC LOCOMOTIVE.
APPLICATION FILED JULY 22, 1907.
902,476.
Patented Oct. 27, 1908.
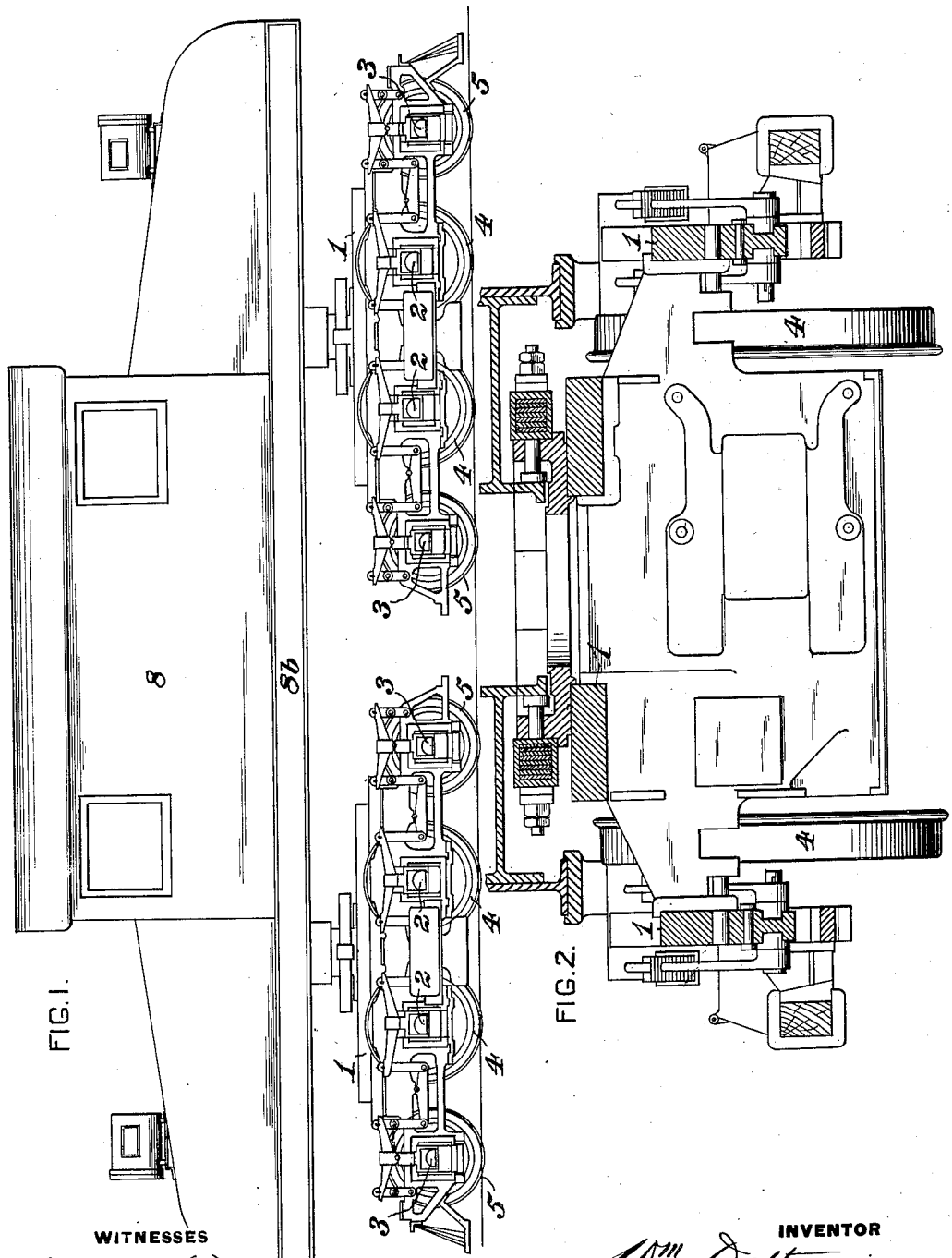
WITNESSES
James C. Herron
S. R. Bell
INVENTOR
W<sup>m</sup> Dalton
Att'y.

UNITED STATES PATENT OFFICE.

WILLIAM DALTON, OF SCHENECTADY, NEW YORK, ASSIGNOR TO AMERICAN LOCOMOTIVE COMPANY, OF NEW YORK, N. Y., A CORPORATION OF NEW YORK.

ELECTRIC LOCOMOTIVE.

No. 902,476.

Specification of Letters Patent.

Patented Oct. 27, 1908.

Application filed July 22, 1907. Serial No. 385,018.

*To all whom it may concern:*

Be it known that I, WILLIAM DALTON, of Schenectady, in the county of Schenectady and State of New York, have invented a certain new and useful Improvement in Electric Locomotives, of which improvement the following is a specification.

My invention more particularly relates to high speed electric locomotives in which the weights are comparatively low, and its object is to provide in an electric locomotive of such general type, means for guiding and insuring the safe traverse of the locomotive to, through, and from curved portions of the track, and preventing injury to or spreading of the rails from excessive side pressure thereon due to nosing or lateral motion of the locomotive or its truck.

The improvement claimed is hereinafter fully set forth.

In the accompanying drawings: Figure 1 is a side view, in elevation, of an electric locomotive embodying my invention; and, Fig. 2, a transverse section, on an enlarged scale, through one of the supporting trucks thereof.

In high speed electric locomotives, as heretofore constructed, it has been found desirable, if not absolutely essential, to provide guiding wheels in advance of the driving wheels, in order to relieve the side pressure of the latter on the rails, and prevent the locomotive from mounting the rails on curves. In cases where the wheel base is short and the weights low on account of the motor construction and location, the guiding wheels are further advantageous in lengthening the wheel base and reducing the side pressure on the rails due to nosing motion. As electric locomotives are designed to be run normally in either direction, without being turned, it becomes necessary to provide guiding wheels at each end, and this has heretofore been done by using separate guiding trucks at each end of the machine. It has also been the practice, in order to secure a flexible wheel base which will admit of passing around curves of comparatively short radius, to dispose the driving wheels of electric locomotives in two independent trucks, each adapted to swing or swivel about the axis of a central pivot in the manner of car trucks.

In the practice of my invention, a simplification of prior constructions is effected, and the desired capacity of traversing curves at high speeds with safety, and without injurious effect by reason of side motion, is attained, by providing an electric locomotive which is supported upon a swiveling truck or trucks, each of which comprises two or more pairs of driving wheels, and pairs of guiding wheels located in front and in rear, respectively, of the driving wheels, adjacent to each end of the truck frame.

Referring to the drawings, the main frame, $8^b$, and cab, 8, of the locomotive, within which cab the usual electrical controlling equipment is located, are supported and carried upon two trucks, 1, 1, which are adapted to swivel about pivotal axes on the main frame, and which, except as to the character and positions of their wheels, may be of any suitable and preferred construction known in present practice, the specific structure, in other particulars, of the truck frames and their accessories, not forming part of my present invention. Each of the trucks, 1, is provided with a plurality of driving wheels, 4, secured upon axles, 2, journaled in axle boxes in the truck frame in the ordinary manner, and rotated by electric motors of any suitable and preferred type, which, as they do not form part of my present invention, need not be herein at length set forth. The driving axles of each truck are located intermediate of two guide wheel axles, 3, which are journaled in axle boxes adjacent to the ends of the truck frame, and have secured upon them pairs of guide wheels, 5, which are preferably, as shown, of smaller diameter than the driving wheels, 4. Under this construction, a better division of the weight borne by the truck is attained, and it is distributed over a greater number of points of contact with the rails, a longer wheel base is provided, and the truck is effectively guided in passing to, through and from curves, in either direction of movement of the locomotive.

The advantage attained in insuring safety and reducing injurious action upon the rails will be manifest to those familiar with the operation of electric locomotives at high speeds.

I claim as my invention and desire to secure by Letters Patent:

1. A swiveling truck for supporting an electric locomotive frame comprising a plurality of pairs of driving wheels, each fixed upon a motor driven driving axle, and guide wheel axles carrying pairs of guide wheels and journaled in bearings adjacent to the ends of the truck.

2. In an electric locomotive, the combination of a main frame, cab, and the ordinary accessories therein, and a truck pivotally connected thereto and provided with pairs of guide wheels journaled adjacent to its ends and a plurality of pairs of driving wheels journaled intermediate the guide wheels.

3. In an electric locomotive, the combination of a main frame, cab, and the ordinary accessories therein, and two trucks, each pivotally connected to said frame and provided with pairs of guide wheels journaled adjacent to its ends and a plurality of pairs of driving wheels journaled intermediate the guide wheels.

WILLIAM DALTON.

Witnesses:
M. A. GILMORE,
FRANK T. BRIGGS.